(12) United States Patent
Schober et al.

(10) Patent No.: US 11,441,454 B2
(45) Date of Patent: Sep. 13, 2022

(54) VALVE FOR INTERNAL COMBUSTION ENGINES HAVING A GUIDE VANE FOR COOLANT

(71) Applicant: FEDERAL-MOGUL VALVETRAIN GMBH, Barsinghausen (DE)

(72) Inventors: Dirk Schober, Uetze (DE); Stefan Kellermann, Barsinghausen (DE); Guido Bayard, Dortmund (DE)

(73) Assignee: Federal-Mogul Valvetrain GmbH, Barsinghausen (DE)

( * ) Notice: Subject to any disclaimer, the term of this patent is extended or adjusted under 35 U.S.C. 154(b) by 381 days.

(21) Appl. No.: 15/762,170

(22) PCT Filed: Jul. 27, 2016

(86) PCT No.: PCT/EP2016/067854
§ 371 (c)(1),
(2) Date: Mar. 22, 2018

(87) PCT Pub. No.: WO2017/050468
PCT Pub. Date: Mar. 30, 2017

(65) Prior Publication Data
US 2018/0274401 A1 Sep. 27, 2018

(30) Foreign Application Priority Data
Sep. 22, 2015 (DE) ............. 10 2015 116 009.9

(51) Int. Cl.
*F01L 3/14* (2006.01)
*F16K 49/00* (2006.01)
*F01L 3/10* (2006.01)

(52) U.S. Cl.
CPC .............. *F01L 3/14* (2013.01); *F16K 49/007* (2013.01); *F01L 3/10* (2013.01); *F01L 2301/00* (2020.05);
(Continued)

(58) Field of Classification Search
CPC ....... F01L 3/12; F01L 3/14; F01L 3/16; F01L 3/18; F01L 2101/00; F01L 2103/00; F01L 2103/01; F01L 3/10; F16K 49/007
See application file for complete search history.

(56) References Cited

U.S. PATENT DOCUMENTS

| 1,834,836 A | 12/1931 | Goodwin |
| 2,218,983 A | 10/1940 | Daisley |

(Continued)

FOREIGN PATENT DOCUMENTS

| DE | 1030102 B | 5/1958 | |
| DE | 10057192 A1 * | 5/2002 | ............... F01L 3/14 |

(Continued)

OTHER PUBLICATIONS

Machine Translation of JP 59028005 A PDF File Name: "JP59028005A_Machine_Translation.pdf" (Year: 1984).*

(Continued)

*Primary Examiner* — Grant Moubry
*Assistant Examiner* — Ruben Picon-Feliciano
(74) *Attorney, Agent, or Firm* — Robert L. Stearns; Dickinson Wright, PLLC

(57) ABSTRACT

An internally cooled inlet or outlet valve for internal combustion engines, has a valve disc, a valve stem and a cavity inside the valve stem and the valve disc. A coolant is arranged in the cavity, wherein the cavity is provided with at least one guide vane for the coolant.

14 Claims, 4 Drawing Sheets

(52) U.S. Cl.
CPC ....... *F01L 2303/00* (2020.05); *F01L 2303/01* (2020.05)

(56) References Cited

U.S. PATENT DOCUMENTS

| | | | | |
|---|---|---|---|---|
| 4,187,807 A | * | 2/1980 | Cemenska | F01L 3/18 123/188.2 |
| 5,413,073 A | * | 5/1995 | Larson | B21D 22/21 123/188.3 |
| 5,771,852 A | * | 6/1998 | Heimann, Jr. | B23P 15/002 123/188.11 |
| 2004/0261746 A1 | * | 12/2004 | Narasimhan | B23P 15/002 123/188.3 |
| 2009/0020082 A1 | * | 1/2009 | Suzuki | F01L 3/14 123/41.41 |
| 2016/0053641 A1 | * | 2/2016 | Tsuneishi | F01L 3/14 123/41.16 |

FOREIGN PATENT DOCUMENTS

| | | | | |
|---|---|---|---|---|
| DE | 10057192 A1 | | 5/2002 | |
| JP | 59028005 A | * | 2/1984 | ............... F01L 3/18 |
| WO | WO 2014/147759 A1 | | 9/2014 | |
| WO | WO 2014/167694 A1 | | 10/2014 | |

OTHER PUBLICATIONS

Machine Translation of DE10057192A1 PDF file: "DE10057192A1_Machine_Translation.pdf".*

* cited by examiner

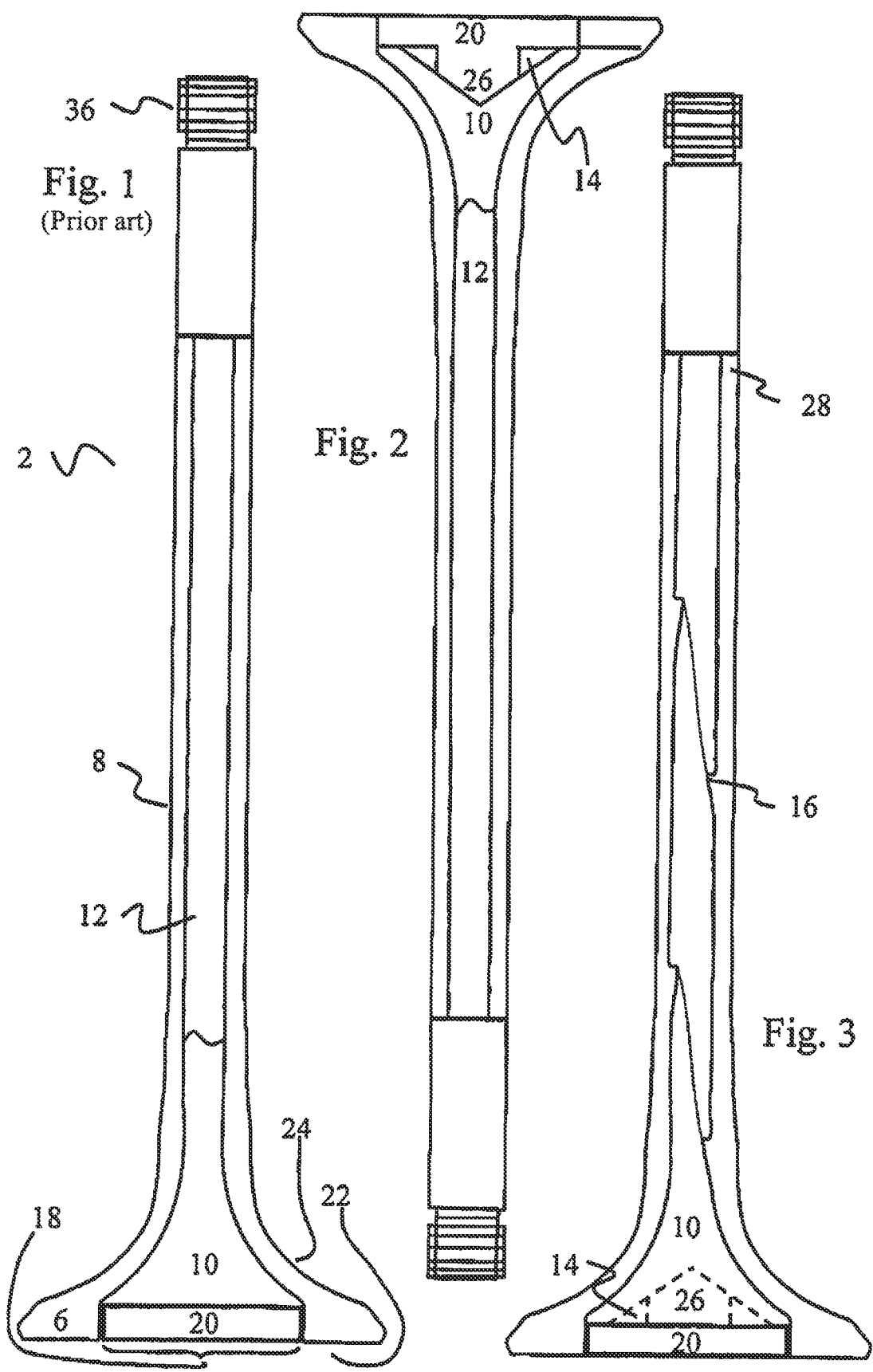

VALVE FOR INTERNAL COMBUSTION ENGINES HAVING A GUIDE VANE FOR COOLANT

BACKGROUND

1. Technical Field

The present invention relates to cooled valves for internal combustion engines. More specifically, the present invention relates to a sodium-cooled inlet or outlet valve for an internal combustion engine, which is provided with guide vanes, in order to control or to influence the movement of the sodium filling inside the valve.

2. Related Art

Internally cooled or sodium-cooled exhaust-gas valves have been known since 1935 at the latest.

Sodium cooling and the effects thereof are well-known in the prior art, and the technical developments of recent years related mainly to an increased coolant volume in the region of the valve disc and simplified production methods, in order to be able to produce sodium-cooled valves more cost-effectively.

SUMMARY

However, there is still a requirement for further improvement of the cooling or the cooling characteristics of exhaust-gas valves in particular. In addition, there is a requirement for having a maximally cooled cavity valve available, which still functions reliably even at the highest possible exhaust-gas temperatures.

According to the present invention, a cooled or internally cooled valve or inlet or outlet valve for internal combustion engines is provided, which comprises a valve disc, a valve stem and a cavity inside the valve stem and the valve disc. The valve is additionally provided with a coolant, which is arranged in the cavity. The cavity is equipped with at least one guide vane for the coolant. The coolant only fills the cavity to some extent and can move inside the cavity. The guide valve is arranged in such a manner in this case, that it converts an up and down movement of the coolant in an axial direction of the valve into a rotational movement around the axis of the valve. The axis of the valve corresponds to the axis of symmetry of the outer contour of the valve.

The invention therefore relates to a cavity valve with guide or turbulence vanes, which are attached in the cavity, in order to achieve a maximum heat transfer between the material of the valve or the valve disc and a coolant or sodium filling.

The present invention is based on the one hand on an enlargement of the inner cavity surface and turbulence or the generation of a circulatory flow in the liquid coolant or sodium filling.

In an exemplary embodiment of the present invention, sodium is used as coolant. However, other alkaline earth metals or alloys with a sufficiently low melting point can also be used.

A further exemplary embodiment of the valve is in at least two parts and has an opening on the valve-disc surface, which is closed by a lid. The lid is connected by joining to the valve-disc surface. The lid can be connected to the disc in a materially-bonded manner by means of laser welding, electron-beam welding, resistance welding or friction welding.

In a further exemplary embodiment of the present invention, the lid is provided with at least one guide vane for the coolant. The at least one guide vane is then attached on the lid and is located, after mounting, in the cavity of the valve body. The at least one guide vane is shaped in such a manner that a coolant flowing out of the hollow stem is conducted into rotation about the valve axis. This can be achieved by means of inclined planes which run tangentially. Preferably, 2 or more guide vanes are used, in order to achieve a rotational symmetry of less than or equal to 180°, as a result of which a symmetrical structure of the valve is possible.

A hollow valve or an internally cooled valve with a hollow stem and a hollow valve head is implemented in such a manner in this embodiment, that rotationally symmetrical turbulence or guide vanes are attached on the valve end face of the cavity. The number of blades or guide vanes is at least one. The guide vanes can be realized from valve steel and in one piece with the valve end face of the cavity. The guide vanes can be connected to one another along the surface of the valve axis. The guide vanes can have a greatest height in the region of the valve axis and fall in height outwards in the radial direction. The guide valves can be curved outwards in the radial direction, in order to move the liquefied sodium filling in a swirling movement or a rotational flow. The arrangement of the guide vanes can be implemented in a turbine-like manner, wherein there is a similarity to radial compressors of turbines in particular.

The guide vanes should effect a targeted movement of the sodium filling, which is liquid at operating temperature, wherein the sodium flows over an enlarged inner valve surface during each valve stroke, and thus can extract a higher amount of heat from a larger inner valve surface during each valve stroke.

Ideally, the lid welded on the valve-disc surface including the guide vanes located thereon should be structured in such a manner that the lid can be forged by means of conventional methods in order to keep the production costs and thus the valve costs as low as possible.

In a further exemplary embodiment of the present invention, the lid comprises at least two guide vanes, which extend symmetrically and spirally outwards from a centre of the lid. The symmetry here is to be understood as a rotational symmetry or a point, or axial symmetry with respect to the longitudinal axis of the valve. The term axial symmetry is here to be understood such that in each plane perpendicularly to the axis of the valve, there is a point symmetry about the point of intersection of the plane with the axis of the valve. The number of guide vanes can be between 2 and 12, wherein odd numbers are also possible. In the case of odd numbers of guide vanes, there is preferably rotational, but not point symmetry. The guide vanes on the lid only generate a rotational flow about the valve axis in the case of a downwardly flowing coolant, that is to say a coolant flowing in the direction of the valve disc.

In an additional exemplary embodiment of the valve of the present invention, the lid comprises a pyramid-shaped or conical structure in the centre, in order to guide the coolant onto the guide vanes. It is likewise provided to use a conical structure, which has a two-dimensionally curved surface, such as a Flamm's paraboloid. A structure with a surface similar to a Flamm's paraboloid can reduce a load for a joint of the lid upon the impact of the sodium, and thus increase the service life of the valve. The Flamm's paraboloid is only a special case of a parabolic cone, which can also be used here in order to prevent a downwardly flowing sodium from exerting a large momentum against the lid and thus against a joint of the lid.

In a further exemplary embodiment of the valve, the guide vane has a triangular cross section. Depending on the design of the triangular cross section, the guide vanes can be shaped like a ramp on the one hand and like a wall on the other hand, so that a circulatory flow in one direction is preferred. Sodium, which is in a rotational flow, could then flow further via the ramps, so that the guide vanes do not prevent further flow of the coolant.

Depending on the embodiment, the vanes could be inclined with respect to the valve axis, which requires an increased manufacturing outlay however.

In an additional exemplary embodiment of the present invention, one side of the at least one guide vane runs perpendicularly to the disc surface. It can likewise be provided that the guide vanes are always inclined overall, in order to be better create a rotational flow.

In a further embodiment of the present invention, the at least one guide vane runs helically in the stem. This design uses the relatively long hollow stem of the valve in order to likewise generate a rotational or circular flow here. In this case, the guide vanes form one or more long coils in the stem. In this design, the guide vanes are shaped similarly to the grooves in a barrel of a firearm. This type of draught guide vane is particularly suitable in connection with a guide vane design, which has a ramp-like side, which allows maintaining the circulatory flow, even if the valve rests in a closed position. It is possible to use a pipe as stem, from which the guide vanes are worked by means of a broach. Thus, without great outlay, one or more guide vanes can be provided on the inner side of the valve shaft, without new technologies having to be developed therefor.

In a different exemplary embodiment of the present invention, the at least one helical guide vane has a triangular cross section. The triangular cross section make it possible, in the case of a very flat triangular cross section, that the liquid sodium is only set rotating during an upward or downward movement. In the case of an opposite rotation, the sodium can slide over the same via a flat ramp, which forms a rear side of the guide vane, without the rotational movement being stopped or an opposite rotational movement being generated. Thus, at high rotational speeds, a constant rotational flow of the coolant can be generated inside the cavity of the valve or inside the valve stem.

In a further exemplary embodiment of the present invention, a side face of the at least one helical guide vane has an area at least 6-times larger than another side of the at least one helical guide vane. This claim relates to a guide vane with one very flat and one very steep side. This design can be realized in such a manner that the rear side of the vane extends around half or all of the inner circumference. A vane of this type has a rear side which is spiral in cross section.

In a further exemplary embodiment of the present invention, the valve stem is realized in multiple parts, wherein at least one part of the valve stem has a through opening. This construction makes it possible in particular to form a helical guide vane in the valve stem, without complicated casting moulds being necessary for that. A valve stem part, which has a through hole, can be formed using the same means, using which grooves are introduced into firearm barrels. This design makes it possible to introduce helical guide vanes into the valve stem using conventional technologies.

In a further embodiment of the present invention, an internally cooled valve for internal combustion engines is provided, in which the lid is additionally provided with at least one relief groove, which relieves a joint between the opening of the valve disc surface and the lid. The relief groove runs in the vicinity of the joint internally and/or externally on the lid. The relief groove reduces the material thickness of the lid and imparts a greater elasticity to it, which in turn reduces the load of the joint between the lid and valve disc. As a whole, a lid which is less flexible due to the guide vanes can therefore be constructed more elastically again, so that only a portion of the forces is transmitted directly to the joint in the event of loading of the lid. Overall, due to the grooves, a part of the load can be absorbed and as a result, loading of the joint can be reduced and thus the total service life of the internally cooled valve can be increased. Preferably, two relief grooves are used internally and externally in each case, in order to achieve a maximum elasticity of the lid. The arrangement of the relief grooves can create a type of corrugation, using which an elastic connection can be generated between the centre of the lid and the edge of the lid. Due to the relief grooves, the joint is relieved during an inward or outward flexion of the lid, as a result of which failure of the joint can be delayed or prevented. The lid and the valve disc can be joined by laser welding, electron welding, resistance welding or friction welding. Without the relief groove, the flexion of the lid would generate correspondingly higher tensile loads at the joint, which approximately corresponds to the loading of a substrate clamped on two sides, wherein large tensile stresses may occur at the joint even in the case of small deformations.

THE DRAWINGS

In the following, the present invention is explained in more detail on the basis of illustrations of exemplary embodiments. The figures only constitute schematic illustrations.

FIG. 1 illustrates a conventional internally cooled valve 2 with a valve stem 8, which terminates at one lower end in a valve disc 6. The valve stem 8 ends at the top at stem end 36, at which the valve is usually controlled. Internally, the valve is provided with a cavity 10, which is filled with a coolant 12. Sodium is usually used as coolant, which is present in a liquid state at operating temperatures of the internal combustion engine. Usually, not all of the cavity, but only ⅔ to ¾ of the cavity of the valve is filled with sodium. During operation, the sodium moves up and down in the valve stem 8 or in the cavity 10 of the valve stem 8 and in the process transports heat form the valve disc 6 in the direction of the cooled valve stem 8 (shaker cooling). In this case, the sodium moves during each opening or closing procedure inside the valve 2. The cavity 10 was created in the valve 2 in that the valve disc 6 was provided with an opening 18 on the valve disc surface 22. The cavity 10 was introduced into the valve disc 6 and the valve stem 8 through the opening 18. It is likewise possible at least to some extent to drill the cavity from the valve stem end and to close this cavity by means of a valve stem end connected by means of friction welding, for example. After the welding of the lid, the sodium can be poured in through a bore, for example on the valve stem. The bore can also be closed by means of a valve stem end which is placed and welded on. However, it is likewise possible, after pouring in the sodium coolant 12, to close the opening 18 by means of a lid or cover piece 20. The lid was joined to the valve disc by means of laser welding, electron-beam welding or resistance welding. The valve-disc rear side 24 and the upper end of the valve stem do not have joints in this design and the valve disc can be produced in one piece with the valve stem. In addition, it is possible to connect the valve stem and the valve disc or the valve head to one another by means of a weld seam, for example by means of friction welding. However, it is likewise possible to fill the cavity of the valve through the stem or through a bore in the valve stem and then to close the bore. It is likewise possible to fasten the lid on the valve disc by means of friction welding.

FIG. 2 shows an internally cooled valve according to the invention with guide vanes for a coolant, which are arranged on the lid.

FIG. 3 is an illustration of an internally cooled valve according to the invention with guide vanes for a coolant, which are arranged in the stem.

DETAILED DESCRIPTION

Figure 4:
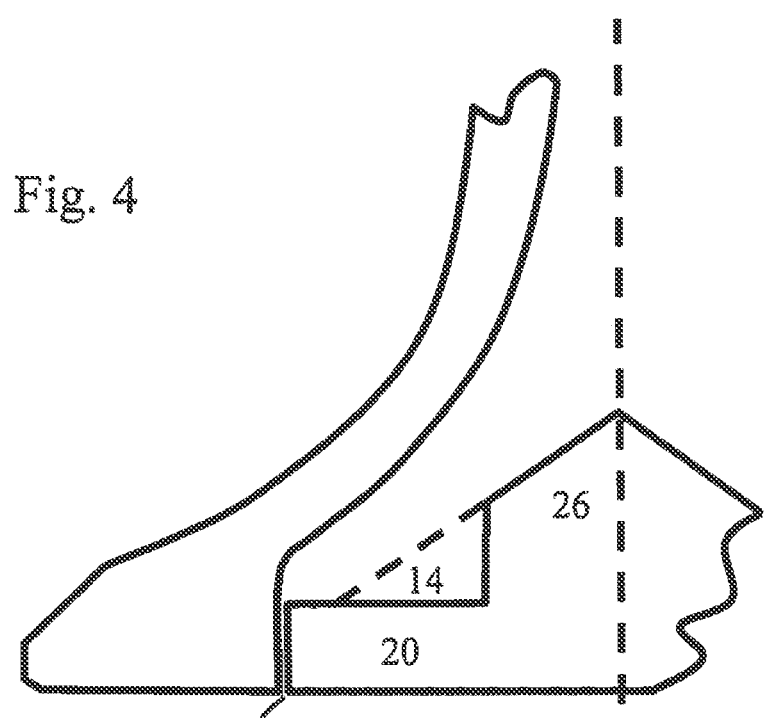
FIG. 4 shows a part sectional view through the valve disc of FIG. 2.

Both in the description and in the figures, the same or similar reference numbers are used in order to refer to the same or similar components and elements. In order to avoid excessive length of the description, elements which have already been described in one figure are not mentioned separately in further figures.

FIG. 1 illustrates a conventional internally cooled valve 2 with a valve stem 8, which terminates at one lower end in a valve disc 6. The valve stem 8 ends at the top at stem end 36, at which the valve is usually controlled. Internally, the valve is provided with a cavity 10, which is filled with a coolant 12. Sodium is usually used as coolant, which is present in a liquid state at operating temperatures of the internal combustion engine. Usually, not all of the cavity, but only ⅔ to ¾ of the cavity of the valve is filled with sodium. During operation, the sodium moves up and down in the valve stem 8 or in the cavity 10 of the valve stem 8 and in the process transports heat form the valve disc 6 in the direction of the cooled valve stem 8 (shaker cooling). In this case, the sodium moves during each opening or closing procedure inside the valve 2. The cavity 10 was created in the valve 2 in that the valve disc 6 was provided with an opening 18 on the valve disc surface 22. The cavity 10 was introduced into the valve disc 6 and the valve stem 8 through the opening 18. It is likewise possible at least to some extent to drill the cavity from the valve stem end and to close this cavity by means of a valve stem end connected by means of friction welding, for example. After the welding of the lid, the sodium can be poured in through a bore, for example on the valve stem. The bore can also be closed by means of a valve stem end which is placed and welded on. However, it is likewise possible, after pouring in the sodium coolant 12, to close the opening 18 by means of a lid or cover piece 20. The lid was joined to the valve disc by means of laser welding, electron-beam welding or resistance welding. The valve-disc rear side 24 and the upper end of the valve stem do not have joints in this design and the valve disc can be produced in one piece with the valve stem. In addition, it is possible to connect the valve stem and the valve disc or the valve head to one another by means of a weld seam, for example by means of friction welding. However, it is likewise possible to fill the cavity of the valve through the stem or through a bore in the valve stem and then to close the bore. It is likewise possible to fasten the lid on the valve disc by means of friction welding.

FIG. 2 illustrates an internally cooled valve 4 according to the invention with guide vanes 14 for a coolant 12. As in FIG. 1, the coolant is located in a cavity 10. The lid 20, which closes the opening 18, has a conical structure 26. The conical structure 26 is used to divert a coolant moving from the stem in the direction of the valve disc 6 in the direction of an outer radius. The conical structure can in this case reduce an impingement/impact momentum of the coolant against the lid, as a result of which a joint between the lid 20 and the valve disc 6 is relieved, which contributes to an increased service life of the valve.

Guide vanes 14 are arranged at the edge of the conical structure 26, which conduct an outwardly flowing coolant into a rotational flow about a valve axis (which runs through the centre of the valve stem 8). A better heat transfer between the coolant 12 and the valve disc 6 should be achieved as a result. As soon as the valve is closed again, the coolant 12 flows back into the valve stem 8, where it is cooled in the region of the valve guide by means of the cylinder head. Ideally, the rotational flow is maintained even in the case of a movement of the coolant in the direction of the stem end, as a result of which even the cooling process can be improved in the upper stem region.

FIG. 3 illustrates an internally cooled valve according to the invention with guide vanes for a coolant in the stem. A circumferential helical guide vane 16 is mounted internally in the hollow stem. The guide vane acts like an Archimedes' screw and moves a downwardly flowing coolant in a rotational flow, which runs about the axis of the valve. The helical guide vane has a steep side and a flat side, so that the helical guide vane does not have any effect on a coolant flowing in the direction of the stem end. It is likewise provided to use two symmetrically arranged guide vanes in order to generate a symmetrically structured stem.

It is likewise possible to design the helical guide vanes such that a coolant flowing in the direction of the shaft end is moved in a rotational flow. In this case, a guide vane geometry should be chosen, which influences a downwardly flowing coolant as little as possible.

In the illustrated embodiment, dashed lines are indicated. The helical guide vane can likewise be combined with a lid, which comprises a conical structure 26 and/or further guide vanes 14. In this design, the rotational flow of the coolant can be generated or maintained both during an upwards and during a downwards movement.

The valve depicted in FIG. 3 comprises a two-part stem, wherein one part 28 of the valve is provided with a through opening 30, which forms the cavity 10 in the finished valve. In the case of a through hole, it is particularly simple to provide the inner side of the stem with a guide vane. If a through hole is present, a structure can for example be introduced into the inner side of the valve stem by means of a broach, without complicated method steps being necessary for that.

It is likewise possible however to create the guide vanes by drawing, wherein a so-called drawing knife is drawn through the valve stem, wherein wither the clamped stem or a drawing rod are rotated with the knife in order to achieve the helical turns. In this case, a plurality of work steps are necessary until the guide vane(s) are introduced by means of the machining of the valve stem. In this case, the guide vanes can be smoothed by lapping.

It is likewise possible to create the helical guide vanes by button drawing. During button drawing, a metal piece, the so-called "button", which has the inverse profile of the cavity or the guide vane on the outside, is drawn through the valve stem. A plurality of drawing steps may be necessary. It may likewise be necessary to straighten the valve stem after these work steps.

It is likewise possible to beat the valve stem, wherein the valve stem blank is provided with a larger through hole, the surface of which is additionally honed. Subsequently, a high-strength dome is introduced into the valve stem, the outside of which has the negative profile of the guide vane(s). Externally arranged forging hammers compress the material until the guide vane(s) have been impressed in the interior of the stem. In this case, an exact, smooth and resistant surface is created in the interior, so that no further post-processing is required.

After the introduction of the helical guide vanes, the valve stem can be closed at the top with a part, which forms the stem end, and at the bottom with a lid according to FIG. 1 or 2. Thus, the coolant can be moved in a rotational flow both in the region of the valve disc and in the region of the stem.

FIG. 4 shows a part sectional view through the valve disc of FIG. 2. The valve disc can be seen in section on the left side. The lid 20 forms a planar disc on which a conical structure 26 is raised. The conical structure 26 runs out in guide vanes 14 in the direction of the edge of the lid 20. The conical structure 26 is not clearly differentiated from the guide vanes 14 by the sectional view.

Figure 4A:
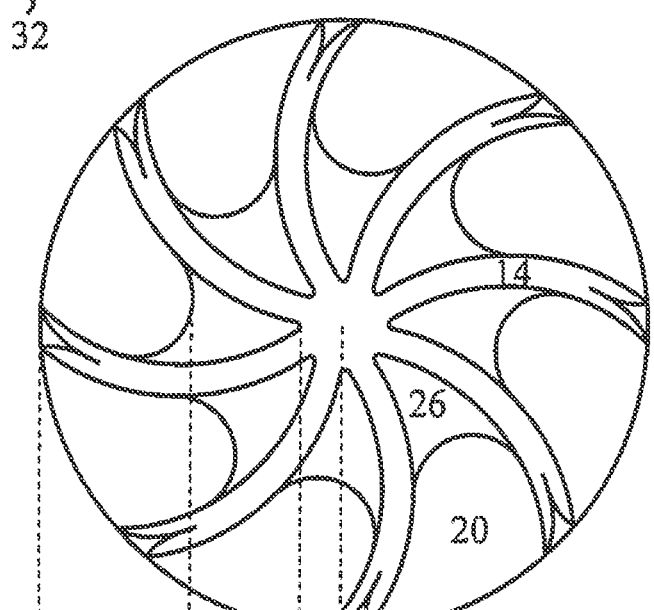
FIG. 4A illustrates a plan view onto the guide vanes of the lid of FIG. 4.

FIG. 4A shows a plan view onto the guide vanes of the lid of FIG. 4. In total, eight guide vanes 14 are arranged, which run outwards from a centre and are bent in the clockwise direction in this case. A fluid flowing onto this structure from above, such as liquid sodium, for example, is forced by this structure into a rotational flow in the clockwise direction. It is likewise possible to align the guide vanes in the other direction, the anticlockwise direction, in each case.

Figure 4B:
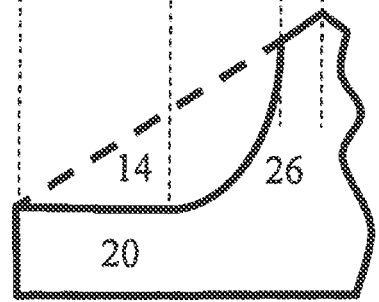
FIG. 4B is an illustration of a part sectional view of the lid of FIG. 4A.

FIG. 4B shows a part sectional view of the lid of FIG. 4B. Along a curved section line which runs exactly between two adjacent guide vanes 14. Here, the shape of the conical structure can be seen better, which conducts a downwardly flowing sodium laterally to the outside to the edge of the valve disc or the lid 20. As the guide vanes 14 are curved, the sodium cannot move outwards in a straight line, but rather is deflected in the clockwise direction by the guide vanes, as a result of which a circulatory or rotational flow is created, which should improve the contact of the coolant with the interior of the cavity. The coolant can thus transport heat not only by thermal conduction, but also by means of a movement of the coolant, as a result of which the total heat transport is improved.

Figure 5A:
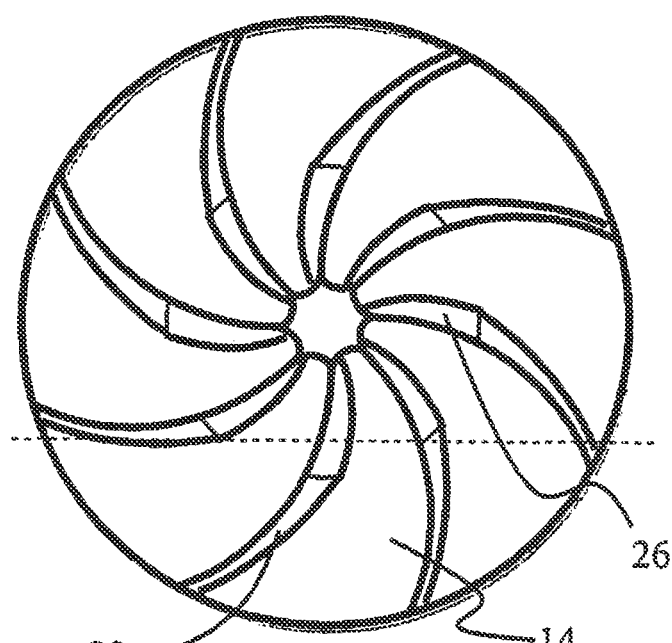
FIG. 5A shows a plan view onto the guide vanes of a further embodiment of a lid.

FIG. 5A shows a plan view onto the guide vanes of a further embodiment of a lid. The lid of FIG. 5A has inclined guide vanes 14, which are arranged similarly to those of a turbo-compressor wheel. Depending on the vane shape, a stronger rotational flow can therefore be achieved.

Figure 5B:
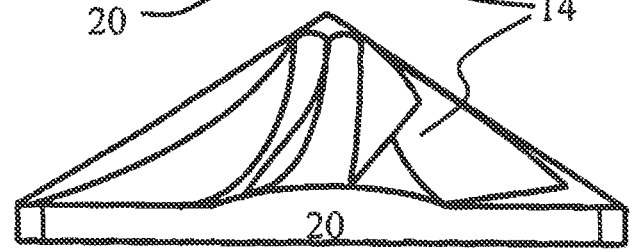
FIG. 5B illustrates a part sectional view of the lid of FIG. 5A.

FIG. 5B shows a part sectional view of the lid of FIG. 5A. In the figure, it can clearly be seen how the guide vanes are inclined in order to be better able to generate the rotational flow.

Figure 6A:
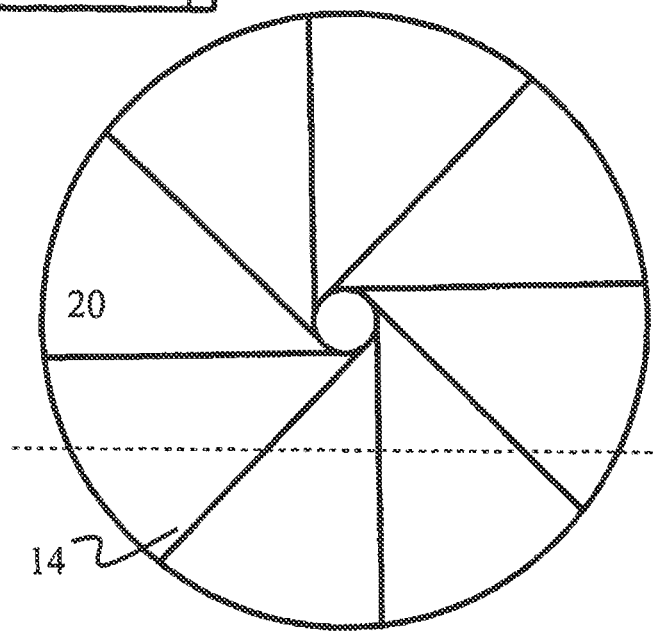
FIG. 6A is an illustration of a plan view onto the guide vanes of a further embodiment of a lid.

FIG. 6A shows a plan view onto the guide vanes of a further embodiment of a lid. In FIG. 6A, the guide vanes 14 run substantially in the radial direction. The rotational flow is here achieved in that one side of the guide vanes 14 is inclined, in order to cause a coolant flowing outwards in the radial direction to be forced into a rotational flow in the clockwise direction. This guide-vane shape and the associated lid can be produced particularly easily by means of drop forging.

Figure 6B:
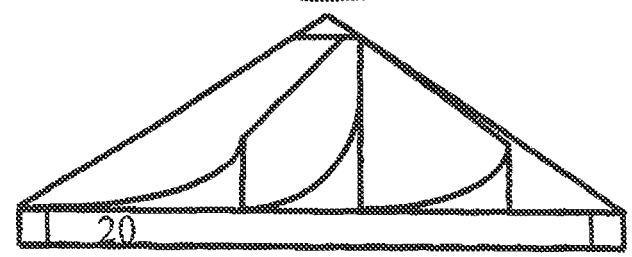
FIG. 6B shows a part sectional view of the lid of FIG. 6A.

FIG. 6B shows a part sectional view of the lid of FIG. 6A, in which the inclined sides of the guide vanes can be seen most clearly. It is likewise possible to combine the substantially triangular shape of the guide vanes with a curved course of the guide vanes 14 in the radial direction.

FIGS. 7A to 7D illustrate embodiments of lids with relief grooves.

Figure 7A:
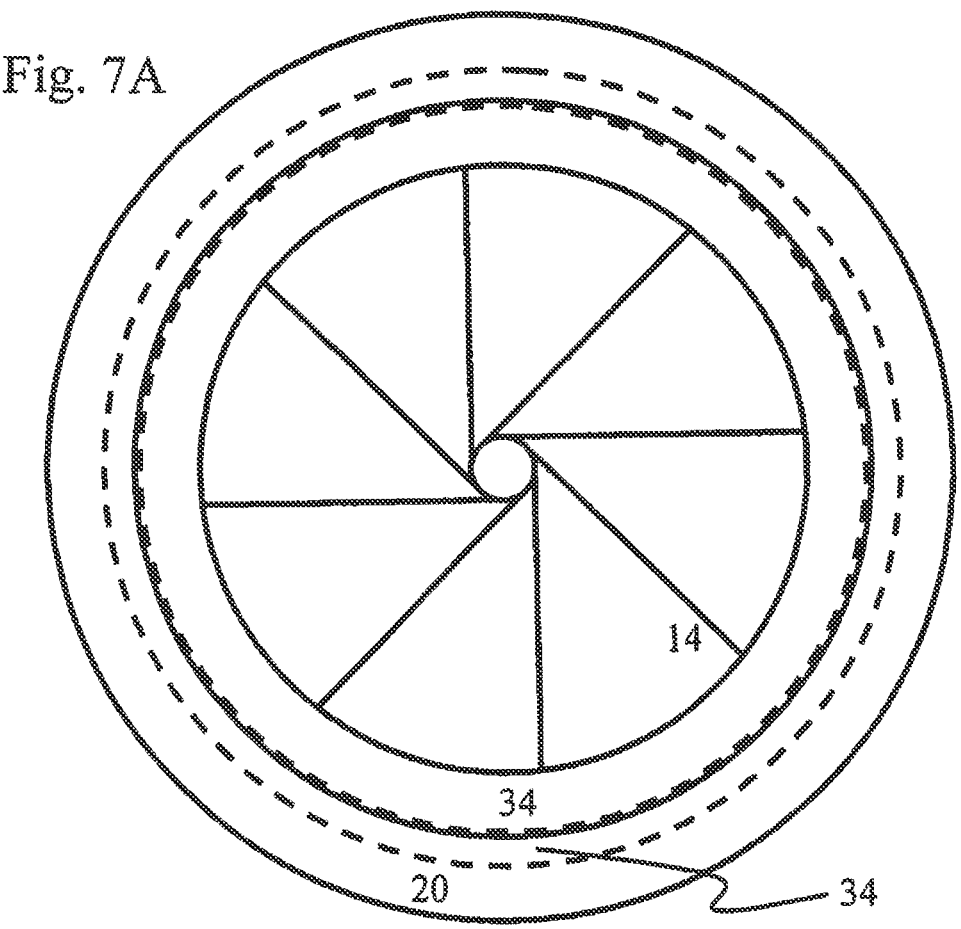
FIGS. 7A to 7D illustrate embodiments of lids with relief grooves.

FIG. 7A shows a plan view onto a lid 20 with guide vanes according to FIG. 6A or 6B in a plan view. In FIG. 7A only part of the lid 20 is provided with the guide vanes 14 and an outer edge is formed around the guide vanes 14. Two relief grooves 34 are introduced in the region, which are mounted on the inner side and on an outer side in each case. The precise position of the relief grooves can be seen more clearly in FIG. 7B.

Figure 7B:
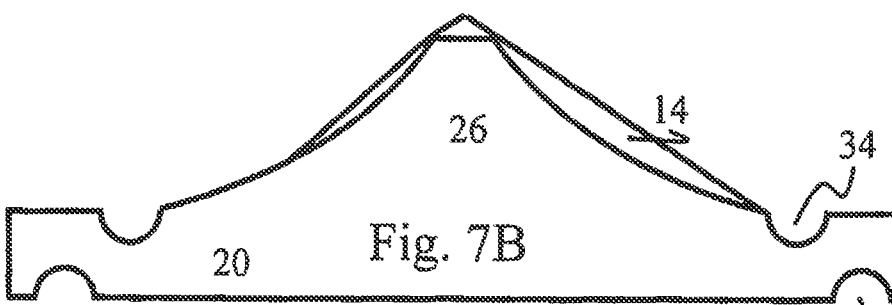

FIG. 7B illustrates a sectional view through FIG. 7A. Two relief grooves 34 are provided on the lid 20 in FIG. 7B. One relief groove is located on the side of the valve disc or the outer side and one relief groove 34 is arranged in such a manner that it lies in the cavity of the internally cooled valve. Both relief grooves 34 reduce the material thickness of the lid in the region of the edge of the lid 20. Due to the relief grooves, the lid 20 can flex more easily, even if the edge of the lid is fixed by means of a joint. If the lid flexes slightly due to a pressure increase in the combustion chamber or owing to a temperature difference in the valve, much larger forces act on the joint between lid and valve disc due to the law of the lever. These forces may be sufficient to overload and destroy a laser weld seam, an electron weld seam or a resistance weld seam between the lid and the valve disc. The edge region of the lid can be configured to be more elastic by means of the relief grooves. In the case of an inwards flexion of the lid, the edge region may flex and the loading of the joint at the edge can be reduced considerably. Depending on the depth and width of the relief grooves, the relief of the joints may turn out to be correspondingly strong. Even if the lid 20 which is present is very stable and flexurally rigid owing to the guide vanes, it is subject to relatively high thermal stresses due to the coolant, which can also be decoupled from the joint at the edge by means of the relief grooves.

Figure 7C:
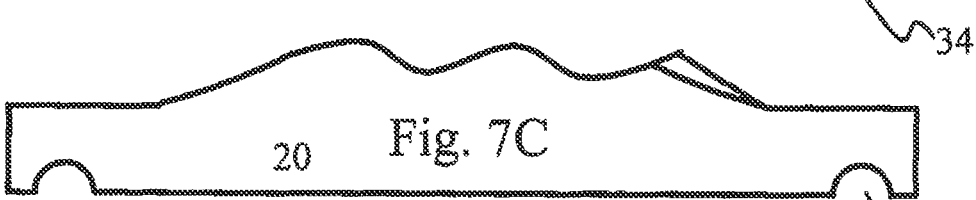
Figure 7D:
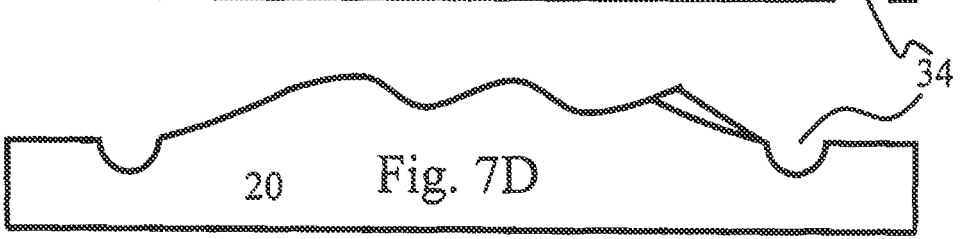

In FIG. 7C, only one relief groove 34 is provided on the outer side of the lid 20. In FIG. 7D, only one relief groove 34 is provided on the inner side of the lid 20. In FIGS. 7C and 7D, the tip of the conical structure 26 has been cut off in each case, in order to be able to accommodate all of the figures together on one page.

It should be clear that here both internally and internally in each case, a plurality of relief grooves can be used, in order to increase the elasticity at the edge of the lid 20. It is likewise provided to combine all individual features of the figures for further embodiments. Thus, for example, the guide vanes of the lid can be combined with corresponding helical guide vanes in the valve stem. It is likewise possible to combine the helical guide vanes in the valve stem with a lid, which is provided with relief grooves 34. It is in addition provided to arrange a guide vane in the valve stem, which moves a coolant moving upwards in the direction of the valve stem end in a rotational flow about a valve axis. It may likewise be provided to allow the helical guide vanes to terminate upstream of an upper end of the valve stem, in order to disturb a rotational flow close to the stem end as little as possible.

The invention claimed is:

1. An internally cooled valve for internal combustion engines, comprising:
a valve disc, a valve stem and a cavity inside the valve stem and the valve disc that extends along a longitudinal axis of the cavity, and a coolant which is arranged in the cavity; wherein the valve is in at least two parts and has an opening to the cavity, the opening to the cavity is located on a bottom surface of the valve disc, the opening to the cavity is closed with a lid; wherein the opening communicates with the cavity and the lid is formed as a separate piece from the valve disc and is joined to the valve disc to seal the opening and cavity against coolant leakage wherein the lid comprises a plurality of guide vanes for the coolant that, extend symmetrically and spirally outwards from a center of the lid; and wherein the plurality of helically extending guide vanes comprise a plurality of guide surfaces which each have a triangular shape when viewed along the longitudinal axis of the cavity and wherein the triangular guide surfaces include straight boundary edges separating each triangular guide surface from adjacent guide surfaces when viewed in the direction of the axis.

2. The internally cooled valve for internal combustion engines according to claim 1, wherein the coolant is sodium.

3. The internally cooled valve for internal combustion engines according to claim 1, wherein the lid comprises a conical structure in the center, in order to conduct the coolant onto the guide vanes.

4. The internally cooled valve for internal combustion engines according to claim 1, wherein each one of the guide vanes has a height which is smaller than half of the height of the cavity for the coolant.

5. The internally cooled valve for internal combustion engines according to claim 1, wherein one side of each one of the guide vanes runs perpendicularly to the bottom surface.

6. The internally cooled valve for internal combustion engines according to claim 1, wherein a side face of at least one of the helical guide vanes has an area at least 6-times larger than another side of the at least one helical guide vane.

7. The internally cooled valve for internal combustion engines according to claim 1, wherein the valve stem includes in multiple parts.

8. The internally cooled valve for internal combustion engines according to claim 1, wherein the lid is additionally provided with at least one relief groove, which relieves a joint between the opening of the bottom surface and the lid.

9. The internally cooled valve of claim 1, wherein the stem includes a plurality of helically extruding guide vanes open to the cavity.

10. An internally cooled valve for internal combustion engines, comprising:
a valve stem;
a valve disc formed as one piece with the stem;
a cavity extending in open communication between the valve stem and the valve disc;
the cavity including a plurality of helically extending guide vanes;
the valve disc having an end that faces longitudinally opposite that of the valve stem;
a passage formed in the end of the valve disc in open communication with the cavity;
a cover piece formed as a separate constructional piece from that of the valve disc disposed within and closing off the passage in the valve disc;
a coolant sealed within and partially filling the cavity; and
wherein the separate cover piece includes a plurality of longitudinally and spirally extending guide vanes which extend from the cover piece into the cavity portion of the valve disc for directing the flow of the coolant in a spiral path when entering the valve disc and wherein the helically extending guide vanes of the cover piece comprise a plurality of guide surfaces that are each generally triangular in shape when viewed along the longitudinal axis of the cavity and wherein each triangular guide surface shares a straight edge boundary with at least one adjacent triangular guide surface.

11. The internally cooled valve of claim 10, wherein the longitudinally and helically extending guide vanes disposed in the cavity of the stem direct the flow of the coolant when traveling along the cavity of the stem.

12. The internally cooled vane of claim 10, wherein the plurality of spirally-extending guide vanes of the cover piece are symmetrical in the longitudinal direction.

13. The internally cooled valve of claim 10 wherein the plurality of spirally-extending guide vanes of the cover piece are formed as one piece with the cover piece.

14. The internally cooled valve of claim 10, wherein each triangular guide surface includes at least two straight edge boundaries.

* * * * *